Patented Mar. 6, 1928.

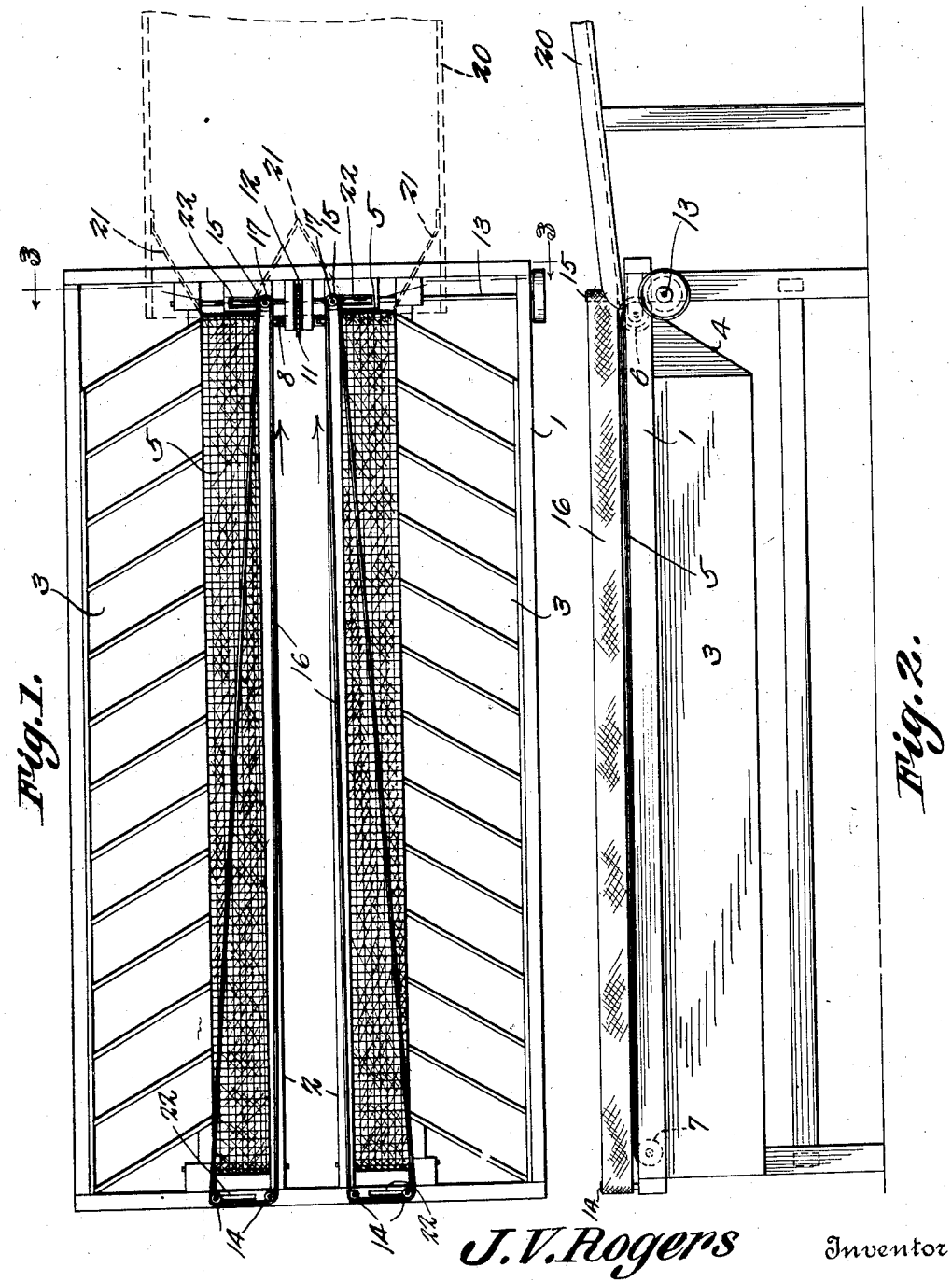

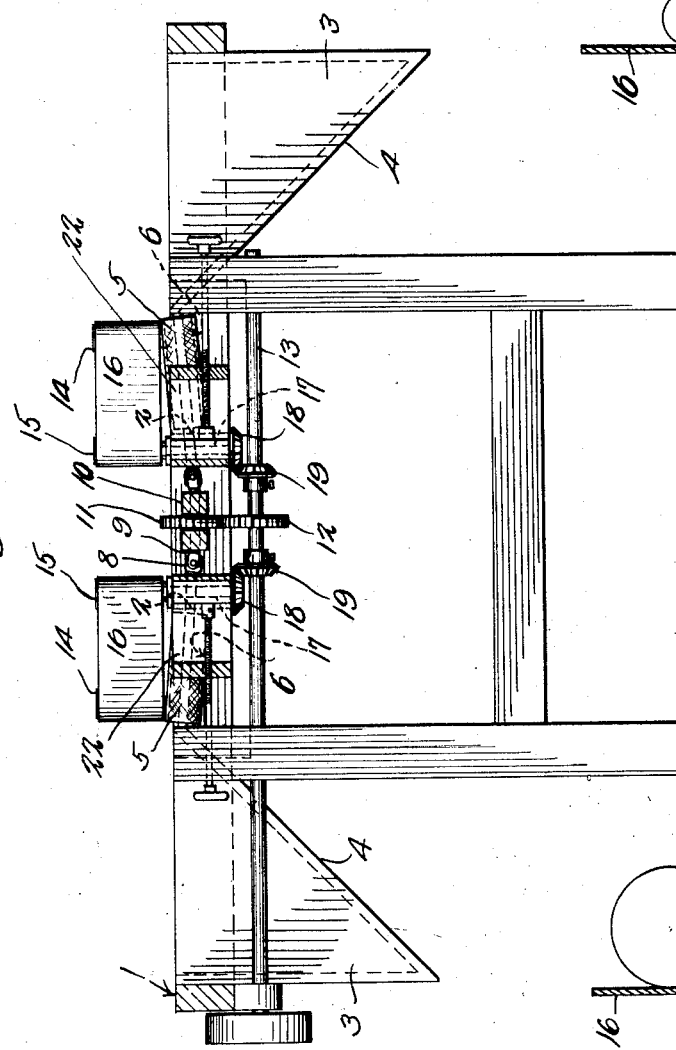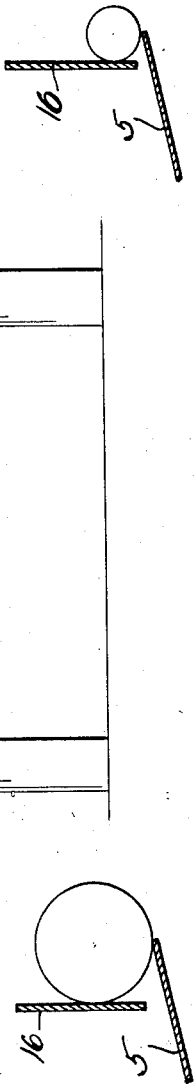

1,661,503

UNITED STATES PATENT OFFICE.

JABIN V. ROGERS, OF CASHMERE, WASHINGTON.

FRUIT-SIZING MACHINE.

Application filed December 23, 1926. Serial No. 156,668.

This invention relates to a machine for sizing fruit and the like, one of the objects being to provide a simple and compact mechanism which can be operated continuously for conveying fruit from a feed hopper to series of bins or other containers into which the fruit will be delivered according to size.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a plan view of the machine, a portion of the feed table being shown by broken lines.

Figure 2 is a side elevation of the machine.

Figure 3 is a section on line 3—3, Figure 1, the belts being shown in elevation.

Figures 4 and 5 are sections through cooperating belts taken at different points and showing fruit of different sizes being ejected.

Referring to the figures by characters of reference 1 designates a frame of any desired proportions provided, along its longitudinal center, with spaced parallel beams 2. Arranged within each side portion of the frame 1 is a longitudinal series of bins 3 preferably arranged obliquely as shown, the bottoms of the bins, in the structure illustrated, being inclined downwardly and laterally as shown at 4.

An endless conveyor belt 5 is located between one of the beams 2 and the adjacent series of bins 3, this belt being inclined downwardly and inwardly so that the two endless belts thus cooperate to provide a fruit supporting table. Each belt 5 is mounted at its ends on rollers 6 and 7 respectively and the rollers 6 can be operated by any suitable mechanism. For example the inner ends thereof can be connected by universal couplings 8 to a transverse shaft 9 journaled in bearings 10 and having a gear 11. This gear receives motion through a gear 12 from a drive shaft 13 extending transversely of and supported by the frame 1. A pair of upstanding rollers 14 is provided at the delivery end of the frame, these rollers being located slightly beyond the adjacent end of the belt 5 and being spaced apart a distance substantially equal to the width of said belt. A single upstanding roller 15 is mounted on each of the beams 2 close to the receiving end of the frame 1. Thus three rollers, 14 and 15, are located in close proximity to each of the belts 5. Mounted on these three rollers is an endless deflecting belt 16 the outer flight of which is extended diagonally across the upper flight of the belt 5. Each roller 15 is secured to a shaft 17 extending downwardly through the beam 2 and provided at its lower end with a gear 18. These gears are adapted to receive motion through gears 19 from the drive shaft 13.

A feed table 20 is arranged at one end of the frame 1 and is inclined downwardly toward and extends over said end of the frame where it is provided with converging deflectors 21 for directing fruits from the feed table 20 onto the respective belts 5.

In practice the fruit to be graded is placed on the table 20 and will gravitate to the respective belts 5. When shaft 13 is in motion the belts 16 will be driven simultaneously in the direction indicated by the arrows in Figure 1 while the belts 5 will also be driven with their upper flights moving away from table 20 in the same general direction as the outer flights of the belts 16. As the belts 5 are inclined downwardly and inwardly or, in other words, as the cooperating flights of the belts 5 and 16 converge downwardly, fruits directed onto each belt 5 will gravitate inwardly against the belt 16. Thus as the belts move in the direction stated, the fruits will be gradually crowded laterally toward the outer edge of the belts 5. The larger fruits will roll off of the edge of the belt 5 into those bins 3 nearest the table 20 while the smaller fruits will not be pushed off of the belt until those bins nearest the other end of the frame are reached. Thus the fruits can be sized with a reasonable degree of accuracy and at high speed.

Although the machine herein described has been referred to as a fruit sizing machine it is to be understood that it can be used efficiently for sizing various other articles.

In order that the machine may be adjusted for grading fruits of different average sizes, the lower ends of the shafts on which the rollers 14 and 15 are mounted can be adjustably mounted within slots 22. Thus the deflecting portion of each belt 16 can have its position relative to the delivery end of the belt 5 changed at will.

Furthermore, if desired, the capacity of the machine could be increased by extending the conveying and deflecting belt, there being additional rollers or a roller on which the deflecting belt could be mounted.

With the machine described a very minute adjustment of fruits of different average size can be effected.

What is claimed is:

1. A fruit sizing machine including an endless conveying belt inclined laterally, and an endless ejecting belt having one flight extending diagonally along the first named belt from a point adjacent and above one end of the lower side thereof to a point adjacent and above the other end at the upper side thereof.

2. A fruit sizing machine including an endless fruit conveying belt inclined transversely, and an endless deflecting belt having one flight extending diagonally across the conveying belt and moving substantially in the same direction as the upper flight of the conveying belt.

3. A fruit sizing machine including an endless conveying belt inclined transversely, means for directing fruit onto said belt at one end of its upper flight, and an endless deflecting belt having one flight extending diagonally across the upper flight of the conveying belt from a point adjacent the lower side of the fruit receiving end of the upper flight of the conveying belt to a point adjacent the outer or upper edge of said flight at the other end thereof.

4. A fruit sizing machine including a series of bins, a fruit conveying belt extending along one side of said series of bins and inclined downwardly laterally away from the bins, means for directing fruit onto the upper flight of said conveying belt, and an obliquely disposed deflecting belt having a flight movable substantially in the same direction as the upper flight of the conveying belt, said flights cooperating to convey fruit longitudinally and to deliver the same laterally up the inclined conveying belt into the respective bins according to size.

5. In a fruit sizing machine an endless conveying belt inclined transversely, a series of bins along and below the upper side of the upper flight of said belt, an endless deflecting belt above the conveying belt and having one flight obliquely disposed and working in a plane upstanding from the conveying belt, the upper flight of the conveying belt and the obliquely disposed flight of the deflecting belt cooperating to expel fruits laterally from the upper edge of the conveying belt into the respective bins according to size.

6. A fruit sizing machine including endless belts spaced apart and having their upper flights converging downwardly, said belts cooperating to provide a fruit conveying table, and an endless deflecting belt above each conveying belt having an inner flight and an outer flight, the outer flight of the belt being obliquely disposed relative to the conveying belt thereunder and cooperating therewith to expel fruits over the upper longitudinal edge of the conveying belt at different points according to size, and bins for receiving the sized fruits.

7. A fruit sizing machine including an endless fruit conveying belt inclined transversely, and an endless deflecting belt having one flight extending diagonally across the conveying belt and moving substantially in the same direction as the upper flight of the conveying belt, the deflecting belt being adjustably mounted relative to the conveying belt.

8. A fruit sizing machine including an endless conveying belt inclined transversely, means for directing fruit onto said belt at one end of its upper flight, and an endless deflecting belt having one flight extending diagonally across the upper flight of the conveying belt from a point adjacent the lower side of the fruit receiving end of the upper flight of the conveying belt to a point adjacent the outer or upper edge of said flight at the other end thereof, said deflecting belt being adjustable laterally relative to the conveying belt to vary the angle of the diagonal flight of the deflecting belt relative to the upper edge of the conveying belt.

In testimony that I claim the foregoing as my own, I have hereto affixed my signature.

JABIN V. ROGERS.